United States Patent
Ro et al.

(10) Patent No.: US 7,283,498 B2
(45) Date of Patent: Oct. 16, 2007

(54) METHOD AND APPARATUS FOR ALLOCATING A PILOT CARRIER ADAPTIVELY IN AN ORTHOGONAL FREQUENCY DIVISION MULTIPLE ACCESS SYSTEM

(75) Inventors: Jung-Min Ro, Suwon-shi (KR); Pan-Yuh Joo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1116 days.

(21) Appl. No.: 10/390,320

(22) Filed: Mar. 17, 2003

(65) Prior Publication Data
US 2003/0174643 A1   Sep. 18, 2003

(30) Foreign Application Priority Data
Mar. 16, 2002   (KR)   ............... 10-2002-0014334

(51) Int. Cl.
*H04Q 7/00* (2006.01)
(52) U.S. Cl. ............... 370/333; 370/208; 370/210
(58) Field of Classification Search ............... None
See application file for complete search history.

(56) References Cited

U.S. PATENT DOCUMENTS

| | | | |
|---|---|---|---|
| 5,603,088 A * | 2/1997 | Gorday et al. | 455/67.13 |
| 5,703,908 A * | 12/1997 | Mammone et al. | 375/278 |
| 5,963,592 A | 10/1999 | Kim | |
| 5,982,327 A | 11/1999 | Vook et al. | |
| 6,058,101 A | 5/2000 | Huang et al. | |
| 6,735,255 B1 * | 5/2004 | Smart et al. | 375/260 |
| 6,973,118 B1 * | 12/2005 | Ikeda et al. | 375/146 |
| 7,099,270 B2 * | 8/2006 | Yamaguchi | 370/208 |
| 2003/0185326 A1 * | 10/2003 | Kolze | 375/371 |
| 2004/0114675 A1 * | 6/2004 | Crawford | 375/149 |
| 2004/0161047 A1 * | 8/2004 | Liu et al. | 375/260 |

FOREIGN PATENT DOCUMENTS

| | | |
|---|---|---|
| CN | 1307431 | 8/2001 |
| KR | 2000-0066459 | 11/2000 |
| WO | WO 99/56424 | 11/1999 |

OTHER PUBLICATIONS

International Search Report dated Jun. 19, 2003 issued in a counterpart application, namely Appln. No. PCT/KR03/00511.

* cited by examiner

*Primary Examiner*—Duc Ho
(74) *Attorney, Agent, or Firm*—The Farrell Law Firm, P.C.

(57) ABSTRACT

A method and apparatus for allocating pilot carriers adaptively in an OFDMA communication system are disclosed. To improve phase error estimation performance and optimize the number of pilot carriers allocated to each sub-channel, an OFDMA transmitter changes the number of pilot carriers for a sub-channel according to the status of the sub-channel. Consequently, less pilot carriers are allocated to a sub-channel in a good state, reducing power consumption and more pilot carriers are allocated to a sub-channel in a bad state, improving channel estimation performance despite increased power consumption.

7 Claims, 6 Drawing Sheets

METHOD AND APPARATUS FOR ALLOCATING A PILOT CARRIER ADAPTIVELY IN AN ORTHOGONAL FREQUENCY DIVISION MULTIPLE ACCESS SYSTEM

PRIORITY

This application claims priority under 35 U.S.C. § 119 to an application entitled "Method and Apparatus for Allocating Pilot Carrier Adaptively in an Orthogonal Frequency Division Multiple Access System" filed in the Korean Industrial Property Office on Mar. 16, 2002 and assigned Ser. No. 2002-14334, the contents of which are incorporated herein by reference.

BACKGROUND OF THE INVENTION

1. Field of the Invention

The present invention relates generally to an orthogonal frequency division multiplexing (OFDM) communication system, and in particular, to a method and apparatus for allocating pilot carriers adaptively to implement orthogonal frequency division multiple access (OFDMA).

2. Description of the Related Art

A typical OFDMA communication system transmits parallel transmission data in mutually orthogonal $N_{used}$ carrier frequencies. $N_{guard}$ carriers having null data are inserted as guard intervals at both sides of the total frequency band. Hence, a total of $N_{FFT}$ (=$N_{used}+N_{guard}$) carriers carry the transmission data. The $N_{used}$ carriers contain N pilot carriers and ($N_{used}-N_{pilot}$) data carriers. Both a transmitter and a receiver know the pilot carriers. Traffic channels are estimated from the phase distortions of the pilot carriers. If the pilot carrier phase distortion is small, channel estimation is carried out with a small number of pilot carriers. Alternatively, with great pilot carrier phase distortion, more pilot carriers are required for acceptable channel estimation performance.

In OFDMA, the $N_{used}$ carriers are divided into $N_{subch}$ sub-channels. One sub-channel is a unit in which a subscriber transmits data. In other words, the subscriber transmits data on one or more sub-channels. Each sub-channel contains $N_{subcarrier}$ sub-carriers. If each subscriber is connected to one sub-channel in OFDMA, the sub-channels are available to up to N (=$N_{subch}$) subscribers. As a result, the number of subscribers can be increased.

With this advantage, OFDM wireless communication systems for high-rate data transmission have been developed, such as digital audio broadcasting (DAB), digital video broadcasting (DVB), digital terrestrial television broadcasting (DTTB), wireless local area network (LAN), and wireless asynchronous transfer mode (ATM). Needless to say, techniques of allocating pilot carriers to each subscriber are essential to implementation of these OFDMA communication systems.

Pilot sub-carrier allocation is also significant to digital wired communication systems adopting discrete multi-tone (DMT) such as asymmetric digital subscriber line (ADSL) and very-high bit rate digital subscriber line (VDSL).

FIG. 1 illustrates a typical OFDMA symbol structure in the frequency domain. Referring to FIG. 1, three sub-channels 101, 102, and 103 are defined. As stated above, one sub-channel is a unit to which one subscriber is connected and $N_{sub}$ sub-channels contain data carriers and pilot carriers. Guard intervals 104 attenuate a signal smoothly in the waveform of a brick wall, thereby preventing interference to adjacent connected channels. A DC sub-carrier 105 represents the center of the frequency band.

Referring to FIG. 1, the total channel frequency is logically divided into sub-channel 1 101, sub-channel 2 102, and sub-channel 3 103 to accommodate as many subscribers as possible by multiple access. Each sub-channel contains different carriers.

FIG. 2 illustrates a conventional carrier allocation method depicting how carriers make up an OFDMA sub-channel. To form a sub-channel with carriers, a particular formula is used. The positions of variable-position pilot carriers 201 are first decided and then the positions of data carriers 202 are decided according to the formula. A constant-position pilot carrier 203 is inserted at a predetermined position between a variable-position pilot carrier 201 and a data carrier 202

Referring to FIG. 2, for transmission of OFDMA symbol 1, the variable-position pilot carriers 201 are selected. Reference numeral 205 denotes indexes indicating the positions of carriers for OFDMA symbol 1. In practice, $N_{subch\_data}$ data carriers and $N_{Subch\_pilot}$ pilot carriers are selected among $N_{used}$ usable carriers across a predetermined frequency band, for forming a sub-channel. Here, $N_{subch\_pilot}$ results from dividing the number of pilot carriers by the number of sub-channels. In other words, the sub-channel for a user contains ($N_{subch\_data}$ and $N_{subch\_pilot}$) carriers across the total frequency band. In this manner, the variable-position pilot carriers 201 are positioned at indexes 0, 13, 27, and 40, the constant-position pilot carrier 203 at index 26, and the data carriers 202 at the remaining indexes for OFDMA symbol 1. If subscribers transmit OFDMA symbol 1, they do so using different carriers in different sub-channels having pilot carriers at the same logical positions. Since the sub-channel forming formula is a function of the number of subscribers, each subscriber is assigned a sub-channel having different carriers.

Since OFDMA subscribers transmit data on sub-channels irrespective of $N_{FFT}$, the numbers of data carriers and pilot carriers are divided by the number of the subscribers, for carrier allocation. Here, the number of pilot carriers is fixed. This implies that there is no problem when a sub-channel is in a good state, but the phase error of a traffic channel is not accurately estimated when the sub-channel in a bad state, thereby degrading channel estimation performance.

SUMMARY OF THE INVENTION

It is, therefore, an object of the present invention to provide a method and apparatus for estimating sub-channel states of subscribers connected to their sub-channels simultaneously using their pilot carriers and adaptively deciding a number of pilot carriers for each subscriber based on an estimation in an OFDMA communication system.

It is another object of the present invention to provide a method and apparatus for adaptively allocating fewer pilot carriers to a subscriber in a good sub-channel state, reducing power consumption, and allocating more pilot carriers to a subscriber in a bad sub-channel state in order to improve phase error estimation performance in an OFDMA communication system.

The above objects are achieved by providing a method and apparatus for allocating pilot carriers adaptively in an OFDMA communication system. To improve phase error estimation performance and optimize the number of pilot carriers allocated to each sub-channel, an OFDMA transmitter changes a number of pilot carriers for a sub-channel according to a status of a sub-channel. Consequently, more pilot carriers are allocated to a sub-channel in a bad state, reducing power consumption and less pilot carriers to a sub-channel in a good state, improving channel estimation performance despite increased power consumption.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention pertains to scheduling pilot carriers, that is, allocation of pilot carriers to each sub-channel to improve phase error estimation performance for implementation of OFDMA in an OFDM communication system. As described above, a fixed number of pilot carriers are assigned to each sub-channel irrespective of its status in the conventional OFDMA scheme. As a result, a sub-channel in a good channel environment causes unnecessary power consumption, while a sub-channel in a bad channel environment suffers a shortage of pilot carriers for channel estimation. In accordance with the present invention, pilot carriers are allocated adaptively according to the channel environment of each sub-channel. An OFDMA transmitter allocates fewer pilot carriers to a sub-channel in a good state and more pilot carriers to a sub-channel in a bad state, such that the bad-state sub-channel can also have improved phase error estimation performance. The present invention is applied to design of transmission signals and standardization of physical layer protocols of a wireless communication network in an OFDM communication system.

The features of adaptive pilot carrier allocation in the present invention are as follows.

(1) Pilot carriers are allocated to each subscriber adaptively according to the subscriber's sub-channel state;

(2) The number of pilot carriers is changed according to sub-channel state irrespective of FFT (Fast Fourier Transform) size ($N_{FFT}$), sub-channel allocation methods, and the positions and number of pilot carriers available to the system;

(3) The number of pilot carriers to be allocated to a sub-channel is determined by comparing a bit error rate (BER) of the sub-channel estimated using its pilot carriers in a base station (BS) with a threshold;

(4) Instead of the BER, the energy or power of the pilot carriers can be compared with the threshold; and (5) One or more thresholds can be compared with the BER.

While the present invention is intended to adaptively allocate pilot carriers to each sub-scriber in OFDMA, it is also applicable to DMT (Discrete Multi-Tone) and other systems with modifications.

Figure 1:
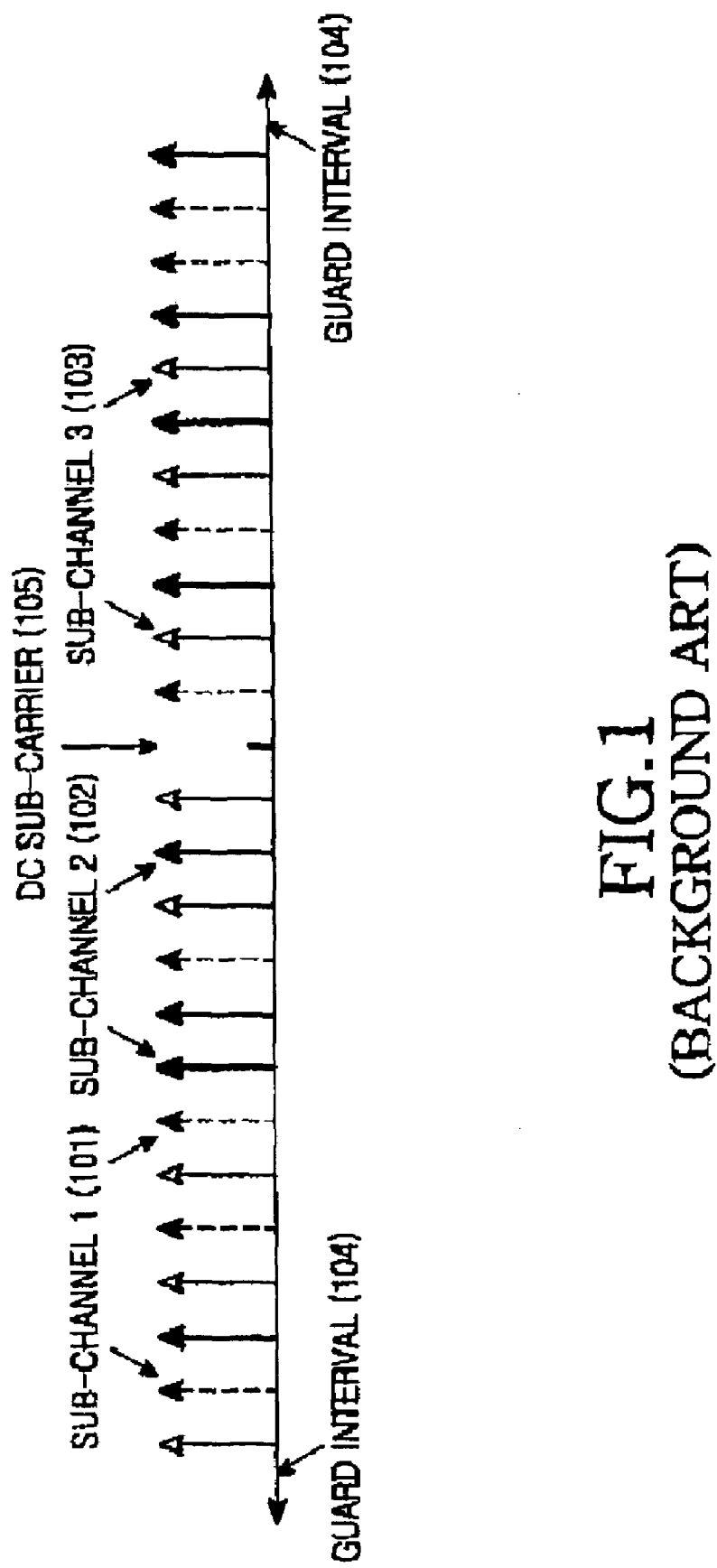
FIG. 1 illustrates a conventional OFDMA sub-channel structure in the frequency domain.
Figure 2:
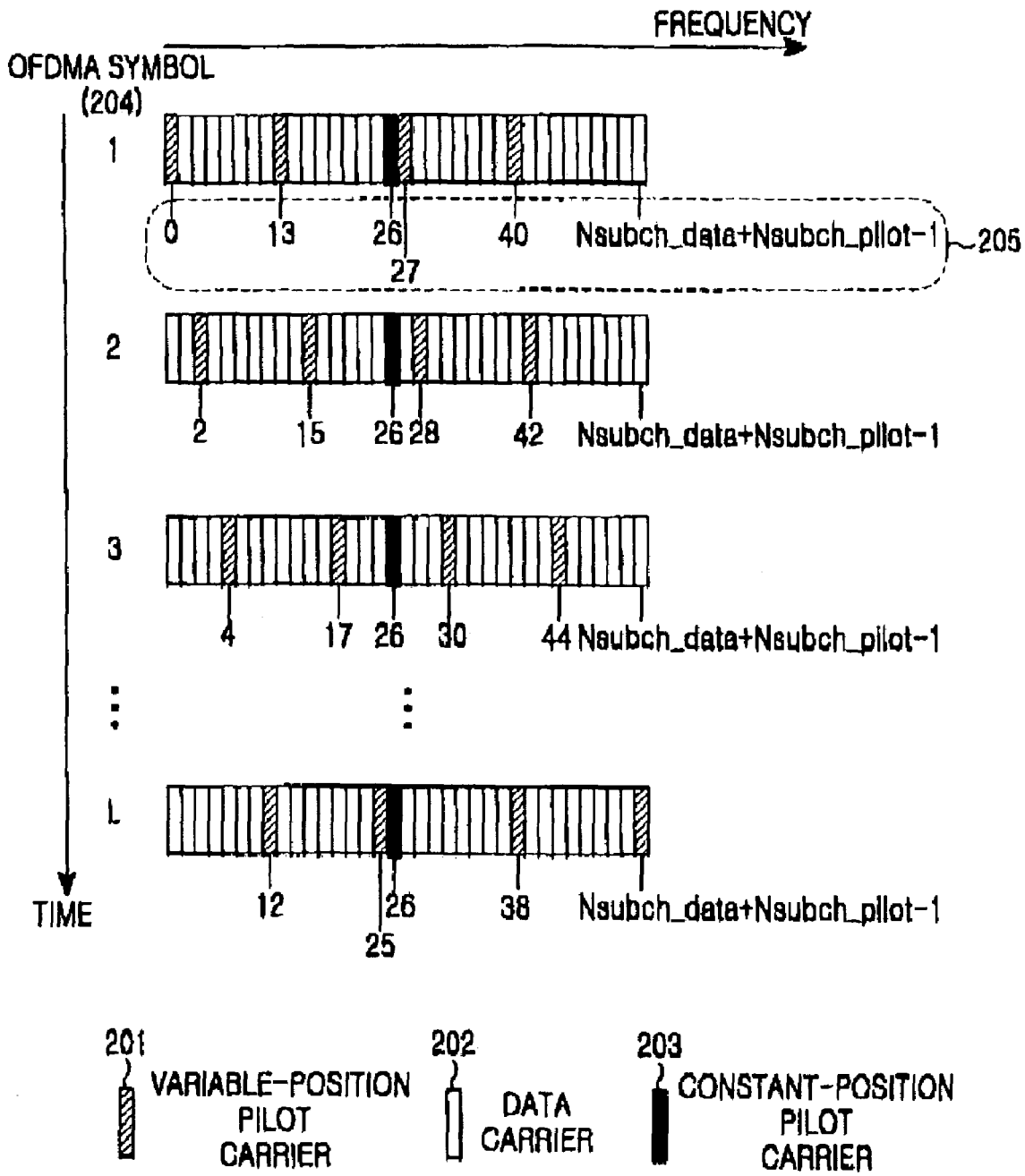
FIG. 2 illustrates a conventional carrier allocation method to form an OFDMA sub-channel.
Figure 3:
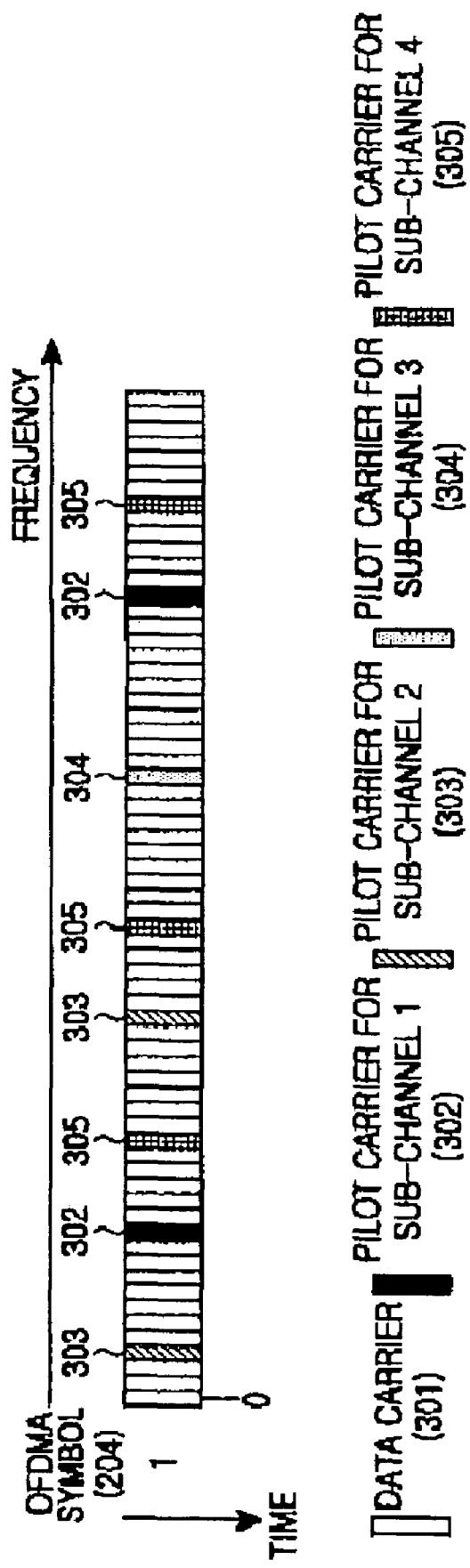
FIG. 3 illustrates an adaptive pilot carrier allocation method to form an OFDMA sub-channel according to an embodiment of the present invention.

FIG. 3 illustrates an adaptive pilot carrier allocation method in an OFDMA communication system according to an embodiment of the present invention. Referring to FIG. 3, 4 sub-channels are defined, each having 2 pilot carriers assigned. Thus, a total of 8 pilot carriers are usable in the system. The total number of carriers is the sum of data carriers and pilot carriers ($N_{data}+N_{pilot}$). For clarity of description, while pilot carriers 302, 303, 304 and 305 are separately shown according to the sub-channels, data carriers 301 are not discriminated by sub-channels in FIG. 3. Although 2 pilot carriers are basically assigned to each sub-channel, the number of the pilot carriers changes according to the sub-channel state. If the BER of the pilot carriers 304 for sub-channel 3, for example, is less than a threshold, the number of the pilot carriers 304 is decreased to 1 for sub-channel 3. If the BER of the pilot carriers 305 for sub-channel 4 is greater than the threshold, the number of the pilot carriers 305 is increased to 3 for sub-channel 4. If the BERs of the pilot carriers 302 and 303 for sub-channels 1 and 2 are within a predetermined range, 2 pilot carriers are maintained for each of sub-channels 1 and 2.

Figure 4:
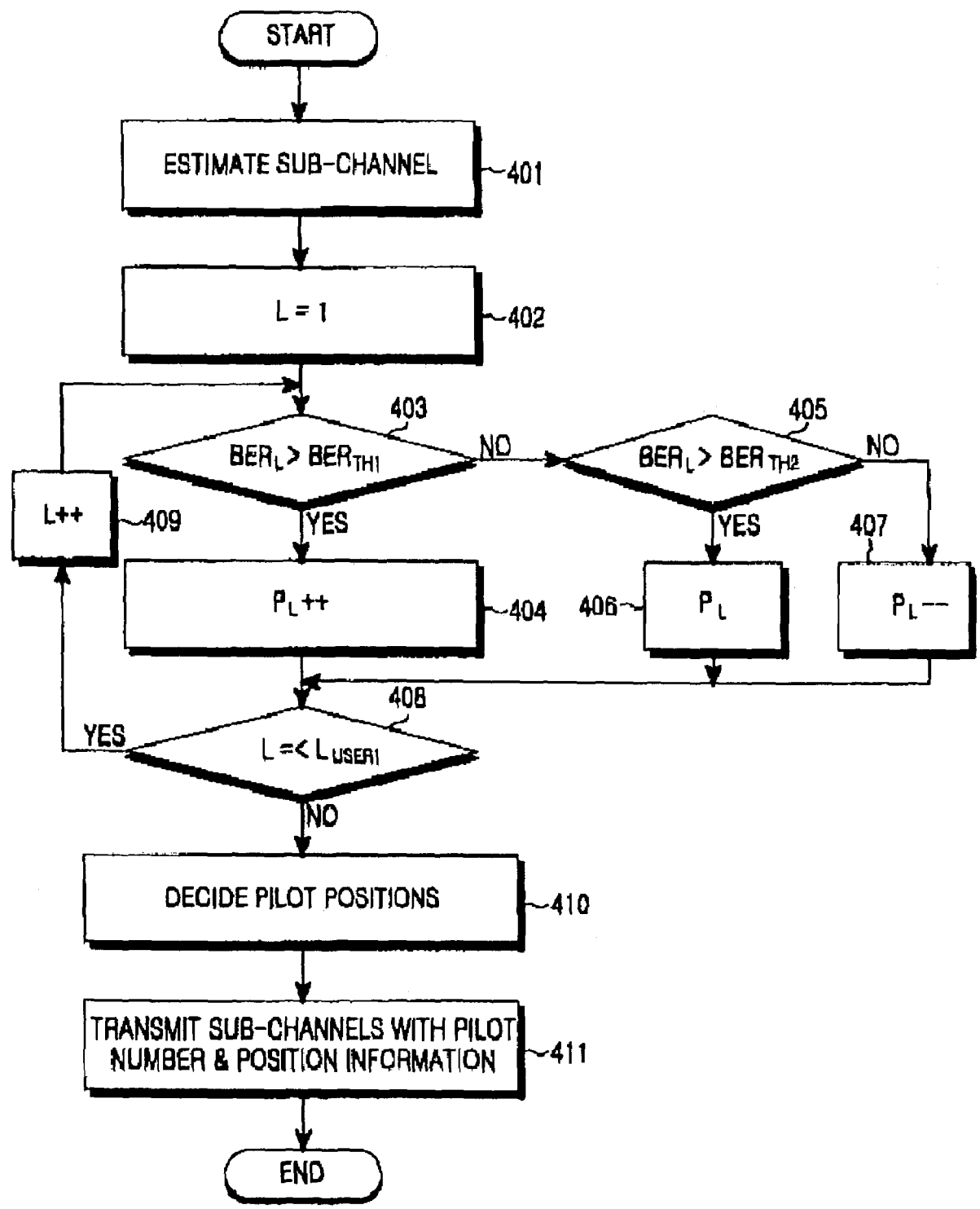
FIG. 4 is a flowchart illustrating the adaptive pilot carrier allocation method according to the embodiment of the present invention.

FIG. 4 is a flowchart illustrating an operation in a BS for allocating pilot carriers to each sub-channel adaptively according to feedback information about forward pilot carriers from mobile stations (MSs) in the OFDMA communication system according to the embodiment of the present invention. Herein, it will be described as an embodiment that one user 1 uses $L_{user}$ sub-channel, and it is assumed that 2 pilot carriers are allocated to each sub-channel and the relation between the total number of pilot carriers available to the system and the number of pilot carriers available to each sub-channel is preset and known to the MSs and the BS. Therefore, the number of pilot carriers cannot be increased continuously for a sub-channel in a bad state and it cannot be decreased continuously for a sub-channel in a good state.

Referring to FIG. 4, a receiver estimates a sub-channel using pilot carriers assigned to each sub-channel and calculates the BER of the sub-channel in step 401 and sets a sub-channel index L to 1 in step 402. As will illustrated later in a description of steps 408 and 409, L is between $L_{user1}$. If the BER ($BER_L$) of the $L^{th}$ sub-channel is greater than a first threshold ($BER_{TH1}$) in step 403, the number ($P_L$) of pilot carriers for the $L^{th}$ sub-channel is increased by 1 in step 404. If $BER_L$ is between $BER_{TH1}$, and a second threshold ($BER_{TH2}$) in steps 403 and 405, $P_L$ is maintained in step 406. If $BER_L$ is less than $BER_{TH2}$ in step 405, $P_L$ is decreased in step 407. Steps 403 to 407 are performed until L is 4 or greater in step 408. If L is less than $L_{user1}$ in step 408, L is increased by 1 in step 409 and the procedure returns to step 403.

After the BERs of all sub-channels are calculated and pilot carriers are correspondingly allocated to the sub-channels, the positions of the pilot carriers are decided in step 410 and the sub-channels containing the allocated pilot carriers and data carriers are transmitted with information about the number and positions of the pilot carriers for each subscriber in step 411.

Figure 5:
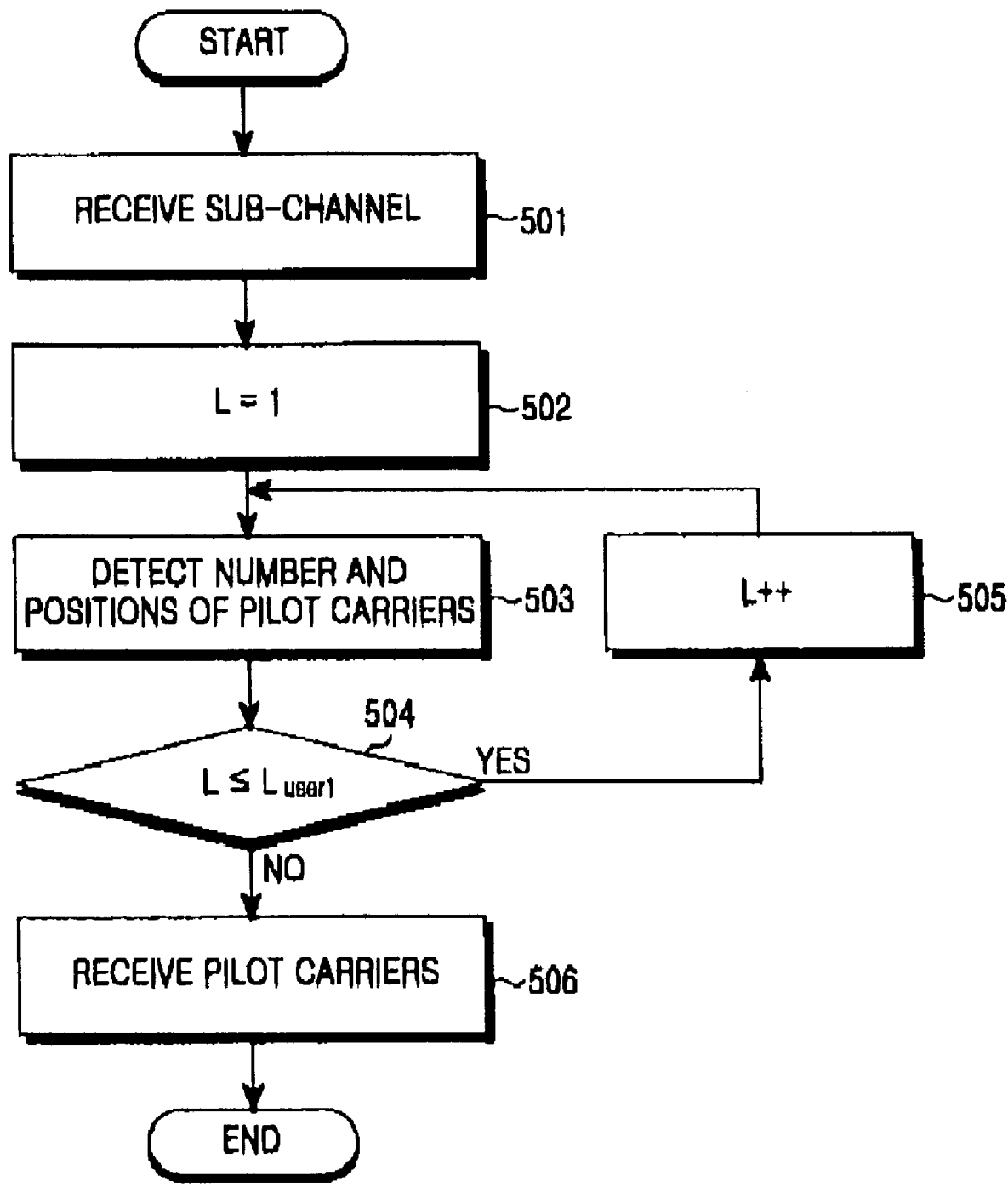
FIG. 5 is a flowchart illustrating an operation for receiving adaptively allocated pilot carriers according to the embodiment of the present invention.

FIG. 5 is a flowchart illustrating an operation for receiving pilot carriers in an MS according to the embodiment of the present invention. This operation is performed using information about the number and positions of pilot carriers for the MS, as received from a BS in the procedure of FIG. 4.

Referring to FIG. 5, the MS receives a sub-channel containing data and information about the number and positions of pilot carriers allocated to the MS in step 501 and sets a sub-channel index L to 1 in step 502. In step 503, the number and positions of the pilot carriers are detected, which is repeated until L is equal to or greater than $L_{user1}$ in step 504." Here, $L_{user1}$ is the number of frequency assigned to one subscriber, ranging from 1 to 4. If L is less than $L_{user1}$ in step 504, L is increased by 1 in step 505 and the procedure returns to step 503. After step 503 is completed for all the sub-channels assigned to the MS, the MS receives pilot carriers using the pilot number & position information in step 506.

Figure 6:
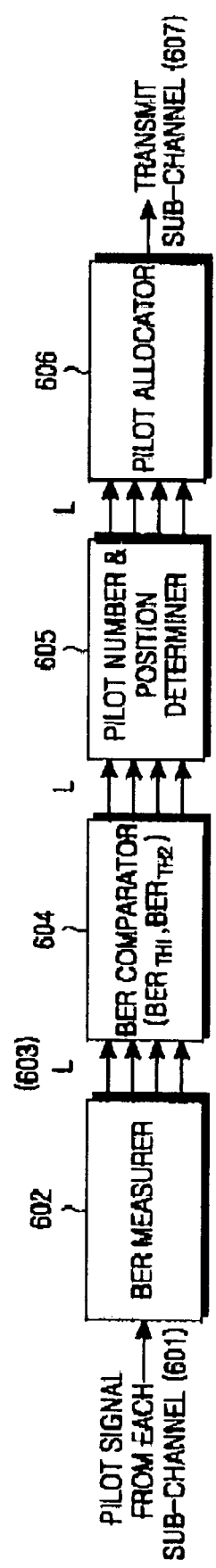
FIG. 6 is a block diagram of an adaptive pilot carrier allocation apparatus according to the embodiment of the present invention.

FIG. 6 is a block diagram of an adaptive pilot carrier allocation apparatus in a BS according to the embodiment of the present invention. Referring to FIG. 6, the BS receives pilot signals from MSs by assigned pilot carriers through a receiver 601. A BER measurer 602 measures the BERs of L sub-channels from the MSs. A BER comparator 604 compares each BER with BER thresholds ($BER_{TH1}$ and $BER_{TH2}$) and determines the sub-channels states of the MSs according to the comparison results. A pilot number & position determiner 605 then determines the number and positions of pilot carriers to be allocated to each sub-channel according to the sub-channel states. A pilot allocator 606 allocates pilot carriers to the sub-channels according to the pilot number & position information received from the pilot number & position determiner 605. The BS then transmits data carriers and allocated pilot carriers together with information about the pilot number & positions to each subscriber through a transmitter 607.

In accordance with the adaptive pilot allocation method for OFDMA in the present invention, less pilot carriers are allocated to a subscriber in a good sub-channel environment, decreasing power consumption, and more pilot carriers to a subscriber in a bad sub-channel environment, improving phase error estimation performance despite increased power consumption. Therefore, overall channel estimation performance is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A pilot carrier allocation method in a base station (BS) in an orthogonal frequency division multiple access (OFDMA) communication system wherein each of a plurality of mobile stations (MSs) is connected to the BS via at least one sub-channel, comprising the steps of:

determining states of the sub-channels connected to the MSs;

decreasing a number of pilot carriers for a sub-channel in a good state; and increasing a number of pilot carriers for a sub-channel in a bad state, the states of the sub-channels are determined according to one of bit error rates (BERs) of the sub-channels and power of the pilot carriers.

2. A pilot carrier allocation method in a base station (BS) in an orthogonal frequency division multiple access (OFDMA) communication system wherein each of a plurality of mobile stations (MSs) is connected to the BS via at least one sub-channel, comprising the steps of:

determining states of the sub-channels connected to the MSs;

decreasing a number of pilot carriers for a sub-channel in a good state;

increasing a number of pilot carriers for a sub-channel in a bad state;

determining positions of the increased or decreased pilot carriers and allocating the pilot carriers in the determined positions; and transmitting a sub-channels containing the allocated pilot carriers.

3. The pilot carrier allocation method of claim 2, wherein the states of the sub-channels are determined according to bit error rates (BERs) of the sub-channels.

4. The pilot carrier allocation method of claim 2, wherein the states of the sub-channels are determined according to powers of the pilot carriers.

5. A pilot carrier allocation apparatus in a base station (BS) in an orthogonal frequency division multiple access (OFDMA) communication system wherein each of a plurality of mobile stations (MSs) is connected to the BS via at least one sub-channel, comprising:

a measurer for measuring states of the sub-channels connected to the MSs;

a determiner for decreasing a number of pilot carriers for a sub-channel in a good state, and increasing a number of pilot carriers for a sub-channel in a bad state; and a pilot allocator for determining positions of the increased or decreased pilot carriers, allocating the pilot carriers in the determined positions, and transmitting the sub-channels containing the allocated pilot carriers.

6. The pilot carrier allocation apparatus of claim 5, wherein the measurer measures the states of the sub-channels according to bit error rates (BERs) of the sub-channels.

7. The pilot carrier allocation apparatus of claim 5, wherein the measurer measures the states of the sub-channels according to powers of the pilot carriers.

* * * * *